United States Patent
Yamashita et al.

[11] Patent Number: 5,825,795
[45] Date of Patent: Oct. 20, 1998

[54] GAS LASER OSCILLATOR APPARATUS

[75] Inventors: Takayuki Yamashita, Toyonaka; Hiroyuki Hayashikawa, Osaka; Satoshi Eguchi, Takarazuka, all of Japan

[73] Assignee: Matsushita Electric Industrial Co., Ltd., Osaka, Japan

[21] Appl. No.: 765,148

[22] PCT Filed: Apr. 26, 1996

[86] PCT No.: PCT/JP96/01161

§ 371 Date: Dec. 23, 1996

§ 102(e) Date: Dec. 23, 1996

[87] PCT Pub. No.: WO96/34437

PCT Pub. Date: Oct. 31, 1996

[30] Foreign Application Priority Data

Apr. 28, 1995 [JP] Japan ................................. 7-105504

[51] Int. Cl.$^6$ ....................................................... H01S 3/097
[52] U.S. Cl. .................................................. 372/38; 372/31
[58] Field of Search .................... 372/38, 31, 29

[56] References Cited

U.S. PATENT DOCUMENTS 4,910,747  3/1990  Hiroshima ................................. 372/86

FOREIGN PATENT DOCUMENTS 1260873  10/1989  Japan .
456367   2/1992   Japan .

*Primary Examiner*—James W. Davie
*Attorney, Agent, or Firm*—Stevens, Davis, Miller & Mosher, L.L.P.

[57] ABSTRACT

The present invention is concerned with a gas laser oscillator apparatus based on gas discharge excitation having a power supply unit, rectifying means connected to the power supply unit, a smoothing capacitor connected in parallel with the rectifying means, a choke coil connected in series with the rectifying means and a laser tube connected in parallel with the smoothing capacitor and in series with the choke coil, wherein a smoothing capacitor capacitance C and an inductance L of the choke coil are determined by $$f > \tfrac{1}{2}\pi\sqrt{LC}.$$

Even when with this construction, the capacitance C of the smoothing capacitor is set to $$f > \tfrac{1}{2}\pi\sqrt{LC},$$

a ripple of a current flowing to the laser tube can be smaller than that in the conventional apparatus and a stable laser output can be obtained.

3 Claims, 2 Drawing Sheets

2  BOOSTING TRANSFORMER
3  RECTIFYING DIODES
4  SMOOTHING CAPACITOR
5  LASER TUBE
6  CHOKE COIL

2 BOOSTING TRANSFORMER
3 RECTIFYING DIODES
4 SMOOTHING CAPACITOR
5 LASER TUBE
6 CHOKE COIL

GAS LASER OSCILLATOR APPARATUS

TECHNICAL FIELD

The present invention relates to a gas laser oscillator apparatus based on gas discharge excitation.

BACKGROUND ART

FIG. 4 shows a circuit of a high voltage DC power supply of a conventional gas laser oscillator apparatus.

In FIG. 4, 1 designates an inverter unit, 2 a boosting transformer, 3 rectifying diodes, 5 a laser tube and 7 a smoothing capacitor.

The operation of the circuit of the high voltage DC power supply constructed as above will be described hereunder. Firstly, a high frequency voltage is generated by the inverter unit 1 and the high frequency voltage is boosted to a high-frequency high voltage by the boosting transformer 2. Next, the high-frequency high voltage is rectified by the rectifying diodes 3, a high voltage after rectification is smoothed by the smoothing capacitor 7 and a DC high voltage is supplied to the laser tube 5 to discharge and excite a laser gas medium filled in the laser tube 5, thereby producing a laser beam.

The above conventional construction, however, faced a problem that when the laser beam was operated in a pulse form, discharge current was disturbed.

Namely, there arose a problem that as shown in FIG. 4, depending on the value of an operating frequency f, a region existed in which the discharge current became unstable, and the laser output became unstable during pulse oscillation at a certain operating frequency f.

DISCLOSURE OF INVENTION

The present invention has solved the above conventional problem and its object is to provide a gas laser oscillator apparatus which can produce a stable laser output.

The gas laser oscillator apparatus of the present invention comprises a power supply unit, rectifying means connected to the power supply unit, a smoothing capacitor connected in parallel with the rectifying means, a choke coil connected in series with the rectifying means, and a laser tube connected in parallel with the smoothing capacitor and connected in series with the choke coil, wherein a smoothing capacitor capacitance C and an inductance L of the choke coil are determined by $$f > \tfrac{1}{2}\pi\sqrt{LC}$$

With this construction, even when the capacitance C of the smoothing capacitor is set to $$f > \tfrac{1}{2}\pi\sqrt{LC}$$

ripple of a current flowing to the laser tube can be smaller than that in the conventional apparatus and a stable laser output can be obtained.

BEST MODE FOR CARRYING OUT THE INVENTION

An embodiment of the present invention will be described hereunder with reference to the drawings.

Figure 1:
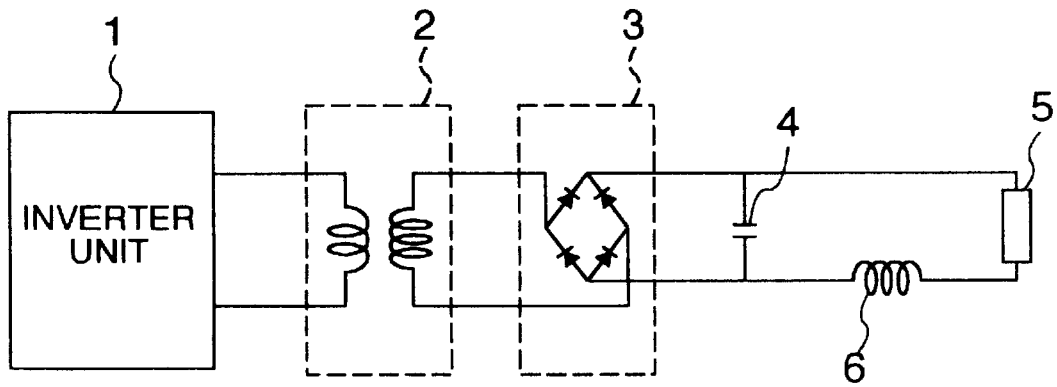
FIG. 1 is a circuit diagram of a high voltage current power supply of a gas laser oscillator apparatus in an embodiment of the present invention.

In FIG. 1, 4 designates a smoothing capacitor having a capacitance C set to $$f > \tfrac{1}{2}\pi\sqrt{LC}$$

and 6 a choke coil having an inductance L and connected in series with rectifying diodes 3 used as rectifying means and a laser tube 5.

The operation of the gas laser oscillator apparatus constructed as above will be described.

Firstly, a high frequency voltage is generated by an inverter unit 1 constituting a power supply unit and the high frequency voltage is boosted to a high-frequency high voltage by a boosting transformer 2 also constituting the power supply unit. Next, the high-frequency high voltage is rectified by the rectifying diodes 3.

Next, a construction characteristic of the present invention will be described.

Since the smoothing capacitor 4 is set to $$f > \tfrac{1}{2}\pi\sqrt{LC},$$

a ripple of current increases and a sufficient smoothing degree cannot be obtained but in a countermeasure thereagainst according to the present invention, the ripple of current is decreased by connecting the choke coil 6.

Figure 2:
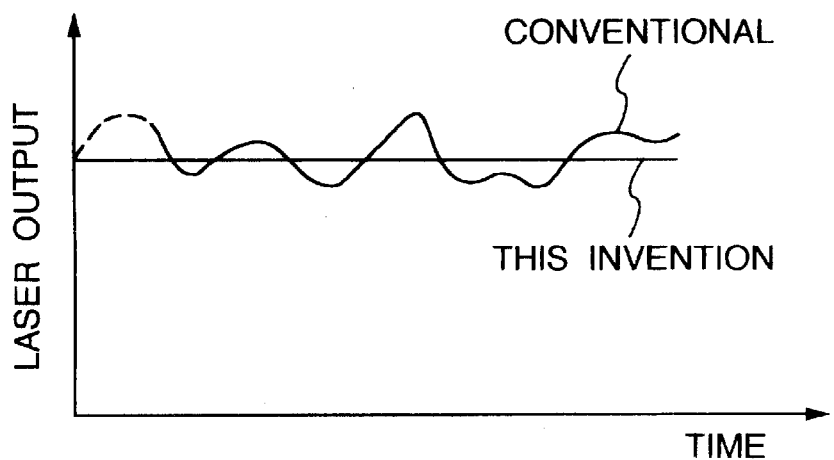
FIG. 2 is a diagram showing a comparison between changes with time in laser outputs of the gas laser oscillator apparatus of the present invention and the conventional gas laser oscillator apparatus.
Figure 3:
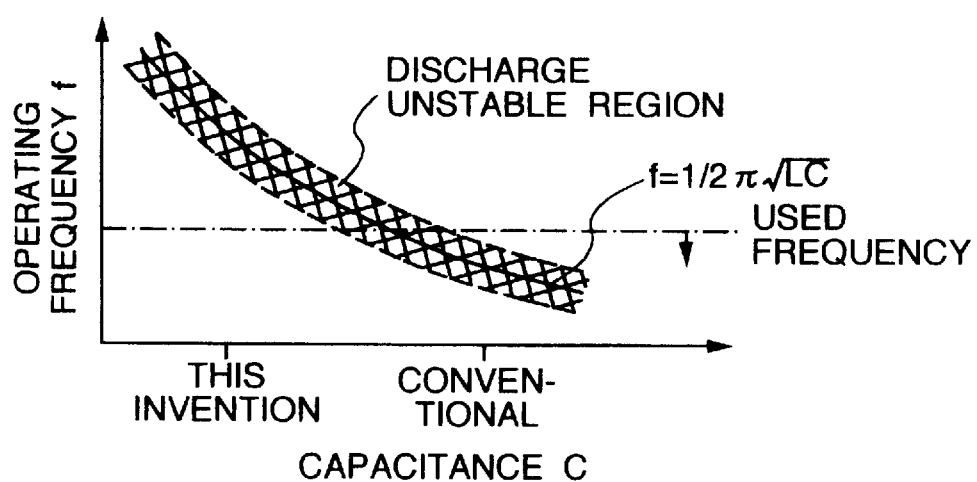
FIG. 3 is a diagram showing the relation between the smoothing capacitor capacitance and the frequency at which discharge is disturbed.
Figure 4:
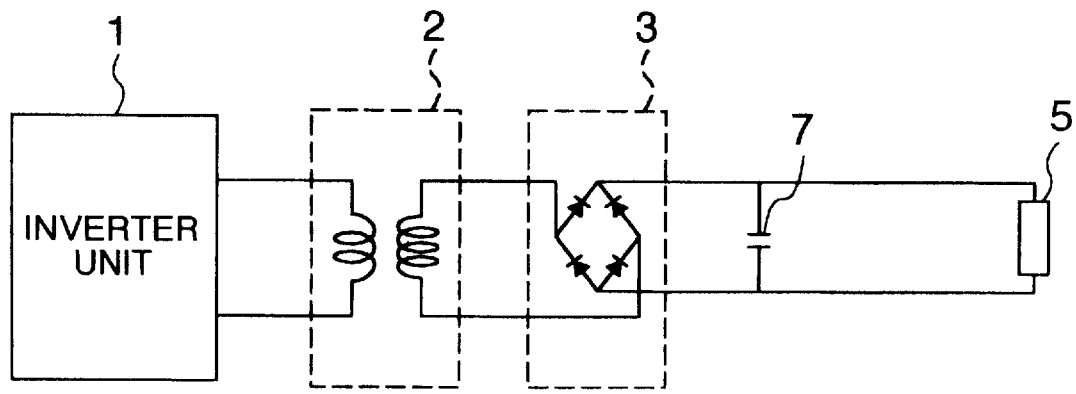
FIG. 4 is a circuit diagram of the high voltage DC power supply of the conventional gas laser oscillator apparatus.

In FIG. 2, a change with time in laser output of the gas laser oscillator apparatus according to the present embodiment is compared with a change with time in laser output of the conventional gas laser oscillator apparatus. As is clear from FIG. 2, with the gas laser oscillator apparatus according to the present embodiment, beneficial advantages can be obtained from the viewpoint of stability of the laser output.

INDUSTRIAL APPLICABILITY

As is clear from the foregoing description, according to the present invention, by providing the smoothing capacitor having capacitance C set to $$f > \tfrac{1}{2}\pi\sqrt{LC}$$

and the choke coil in series with the laser medium, the excellent gas laser oscillator apparatus can be realized which can produce the stable laser output and can realize stable working.

I claim:

1. A gas laser oscillator apparatus comprising:

an inverter unit for generating a high frequency voltage;

a boosting transformer for boosting said high frequency voltage to produce a boosted high frequency voltage;

a rectifying circuit for rectifying the boosted high frequency voltage to produce a rectified high frequency voltage;

a smoothing capacitor for smoothing the rectified high frequency voltage to produce a smoothed voltage;

a gas laser medium for being discharged and excited by the smoothed voltage to generate a laser beam in a pulse form; and a choke coil connected in series with the gas laser medium;

wherein said smoothing capacitor has a smoothing capacitor capacitance C determined by $$f > 1/2\pi\sqrt{LC}$$

wherein f is an operating frequency of the laser beam in the pulse form and L is an inductance of said choke coil.

2. A gas laser oscillator apparatus as in claim 1, wherein the rectifying circuit comprises a plurality of rectifying diodes.

3. A gas laser oscillator apparatus as in claim 1, wherein:

the smoothing capacitor is connected in parallel with the gas laser medium; and the choke coil is connected in series between the smoothing capacitor and the gas laser medium.

* * * * *